US009631625B2

(12) United States Patent
Houst et al.

(10) Patent No.: US 9,631,625 B2
(45) Date of Patent: Apr. 25, 2017

(54) AXIAL TURBINE WITH STATORLESS INLET FORMED BY MERIDIONALLY DIVIDED TURBINE HOUSING AND HEAT SHROUD

(71) Applicant: Honeywell International Inc., Morristown, NJ (US)

(72) Inventors: Vit Houst, Sestajovice (CZ); Vaclav Kares, Strakonice (CZ)

(73) Assignee: Honeywell International Inc., Morris Plains, NJ (US)

( * ) Notice: Subject to any disclaimer, the term of this patent is extended or adjusted under 35 U.S.C. 154(b) by 519 days.

(21) Appl. No.: 13/757,180

(22) Filed: Feb. 1, 2013

(65) Prior Publication Data
US 2014/0219836 A1    Aug. 7, 2014

(51) Int. Cl.
| F04D 25/04 | (2006.01) |
| F01D 1/02  | (2006.01) |
| F01D 9/02  | (2006.01) |
| F02C 6/12  | (2006.01) |
| F02C 3/28  | (2006.01) |
| F02C 3/34  | (2006.01) |
| F02C 7/08  | (2006.01) |

(52) U.S. Cl.
CPC ............. *F04D 25/04* (2013.01); *F01D 1/023* (2013.01); *F01D 9/026* (2013.01); *F02C 3/28* (2013.01); *F02C 3/34* (2013.01); *F02C 6/12* (2013.01); *F02C 7/08* (2013.01)

(58) Field of Classification Search
CPC ........ F04D 25/04; F04D 25/045; F01D 1/023; F01D 9/026; F02C 6/12
See application file for complete search history.

(56) References Cited

U.S. PATENT DOCUMENTS

| 3,614,259 A | 10/1971 | Neff |
| 4,027,994 A | 6/1977 | Macinnes |
| 4,179,892 A | 12/1979 | Deydrich |
| 5,094,587 A * | 3/1992 | Woollenweber ........ F01D 9/026 |
| | | 415/205 |
| 5,870,894 A * | 2/1999 | Woollenweber et al. ...... 60/607 |
| 5,943,864 A | 8/1999 | Sumser et al. |
| 6,062,028 A * | 5/2000 | Arnold et al. .................. 60/612 |

(Continued)

FOREIGN PATENT DOCUMENTS

| DE | 10-2006/022181 A1 | 11/2007 |
| DE | 10-2006/022182 A1 | 11/2007 |
| WO | WO 2006/018255 A1 | 2/2006 |

*Primary Examiner* — Bryan Lettman
*Assistant Examiner* — Timothy Solak
(74) *Attorney, Agent, or Firm* — John C. James

(57) ABSTRACT

A statorless axial turbine for a turbocharger has a turbine housing assembly defining a meridionally divided scroll extending circumferentially and surrounding the turbine wheel, the meridionally divided scroll defining a first scroll extending substantially fully about the turbine wheel and a separate second scroll extending substantially fully about the turbine wheel. The turbine housing assembly defines a separate inlet for each of the first and second scrolls through which a separate exhaust gas stream is received, and separate first and second outlets for each of the first and second scrolls, respectively, through which the respective exhaust gas streams are fed into an inlet side of the turbine wheel generally in an axial direction of the turbine wheel.

8 Claims, 5 Drawing Sheets

(56) References Cited

U.S. PATENT DOCUMENTS

| | | |
|---|---|---|
| 6,260,358 B1 | 7/2001 | Daudel et al. |
| 6,672,061 B2 | 1/2004 | Schmid et al. |
| 6,694,735 B2 | 2/2004 | Sumser et al. |
| 6,941,755 B2 | 9/2005 | Bucknell et al. |
| 7,014,418 B1* | 3/2006 | Arnold ............... F01D 1/22 415/100 |
| 8,353,161 B2 | 1/2013 | Kares et al. |
| 2003/0194333 A1* | 10/2003 | Sumser ............ F01D 17/165 417/407 |
| 2003/0230085 A1* | 12/2003 | Sumser ............ F01D 17/165 60/602 |
| 2007/0180826 A1 | 8/2007 | Sumser et al. |
| 2008/0000229 A1 | 1/2008 | Kuespert et al. |
| 2009/0120087 A1 | 5/2009 | Schmid et al. |
| 2009/0290980 A1* | 11/2009 | Higashimori ............ 415/205 |
| 2010/0307151 A1* | 12/2010 | French ............ F01D 25/002 60/605.1 |
| 2011/0252790 A1 | 10/2011 | Lotterman et al. |
| 2011/0252792 A1 | 10/2011 | Kares et al. |

* cited by examiner

AXIAL TURBINE WITH STATORLESS INLET FORMED BY MERIDIONALLY DIVIDED TURBINE HOUSING AND HEAT SHROUD

BACKGROUND OF THE INVENTION

The invention relates to turbochargers in which a turbine of the turbocharger is driven by exhaust gas from a reciprocating engine. The invention relates more particularly to turbine housings that are divided into a plurality of substantially separate sections each fed by a separate exhaust system.

In multiple-piston reciprocating engines, it is known to design the exhaust system in such a manner as to take advantage of the pressure pulsation that occurs in the exhaust stream. In particular, it is known to employ what is known as "pulse separation" wherein the cylinders of the engine are divided into a plurality of subgroups, and the pulses from each subgroup of cylinders are substantially isolated from those of the other subgroups by having independent exhaust passages for each subgroup. To take best advantage of pulse separation, it is desired to minimize the communication or "cross talk" between the separate groups of cylinders. Accordingly, in the case of a turbocharged engine, it is advantageous to maintain separate exhaust passages all the way into the turbine of the turbocharger. Thus, the turbine housing into which the exhaust gases are fed is typically divided into a plurality of substantially separate parts.

There are basically two ways in which turbine housings have been divided: (1) meridional division, and (2) sector division. In a meridionally divided turbine housing, the scroll or chamber that surrounds the turbine wheel and into which the exhaust gases are fed is divided into a plurality of passages in the meridional plane such that each passage occupies substantially a full circumference and the passages succeed each other in the axial direction, such as shown in FIG. 4 of U.S. Pat. No. 4,027,994.

In a sector-divided turbine housing, the generally annular chamber is divided into angular sectors each of which occupies only a part of the circumference such that the passages succeed each other in the circumferential direction, such as shown in U.S. Pat. No. 6,260,358, which also shows guide vanes that are positioned just radially inwardly of the chamber and guide the flow into the turbine wheel.

The present disclosure relates to meridionally divided turbine housings.

BRIEF SUMMARY OF THE DISCLOSURE

The present disclosure relates in particular to a turbine for a turbocharger, and to a turbocharger having such a turbine, in which a meridionally divided turbine housing feds two separate exhaust gas streams to a "statorless" axial turbine. The term "statorless" means that the turbine has rotating blades but no stators, and in particular has no inlet stator for guiding flow into the blades. Such inlet stators are often called "nozzles" in the axial turbine field, and hence the axial turbine of the present disclosure can also be called "nozzleless."

Thus, in one embodiment disclosed herein, a statorless axial turbine comprises an axial turbine wheel comprising a hub and a plurality of blades extending generally radially outward from the hub, and a turbine housing assembly in which the turbine wheel is mounted, the turbine housing assembly defining a meridionally divided scroll extending circumferentially and surrounding the turbine wheel, the meridionally divided scroll defining a first scroll extending substantially fully about the turbine wheel and a separate second scroll extending substantially fully about the turbine wheel. The turbine housing assembly defines a separate inlet for each of the first and second scrolls through which a separate exhaust gas stream is received.

The turbine housing assembly also defines separate first and second outlets for each of the first and second scrolls, respectively, through which the respective exhaust gas streams are fed into an inlet side of the turbine wheel generally in an axial direction of the turbine wheel. The first outlet is generally radially outward of the second outlet such that the exhaust gas from the first outlet is fed to a radially outer portion of the inlet side of the turbine wheel and the exhaust gas from the second outlet is fed to a radially inner portion of the inlet side of the turbine wheel.

The turbine housing assembly defines a circumferentially and radially extending dividing wall that separates the first scroll from the second scroll, the first outlet being defined in part by a radially inner portion of the dividing wall and the second outlet being defined in part by the radially inner portion of the dividing wall. The radially inner portion of the dividing wall in one embodiment is curved so that a radially inner end thereof extends generally in the axial direction.

The first outlet is defined between the dividing wall and a tip shroud of the turbine housing assembly, the tip shroud and the hub of the turbine wheel together bounding a flow path for the exhaust gases through the turbine wheel.

The turbine housing assembly defines a wall spaced radially inwardly of the radially inner portion of the dividing wall, the second outlet being defined between said wall and the radially inner portion of the dividing wall. In one embodiment the turbine housing assembly comprises a turbine housing and a separately formed heat shroud (e.g., a formed sheet metal part), wherein the heat shroud defines said wall.

In one embodiment the heat shroud is curved similar to the radially inner portion of the dividing wall such that a radially inner end of the heat shroud extends generally in the axial direction. The radially inner end of the heat shroud is at a radial location corresponding to a radially inner end of a leading edge of the blades.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
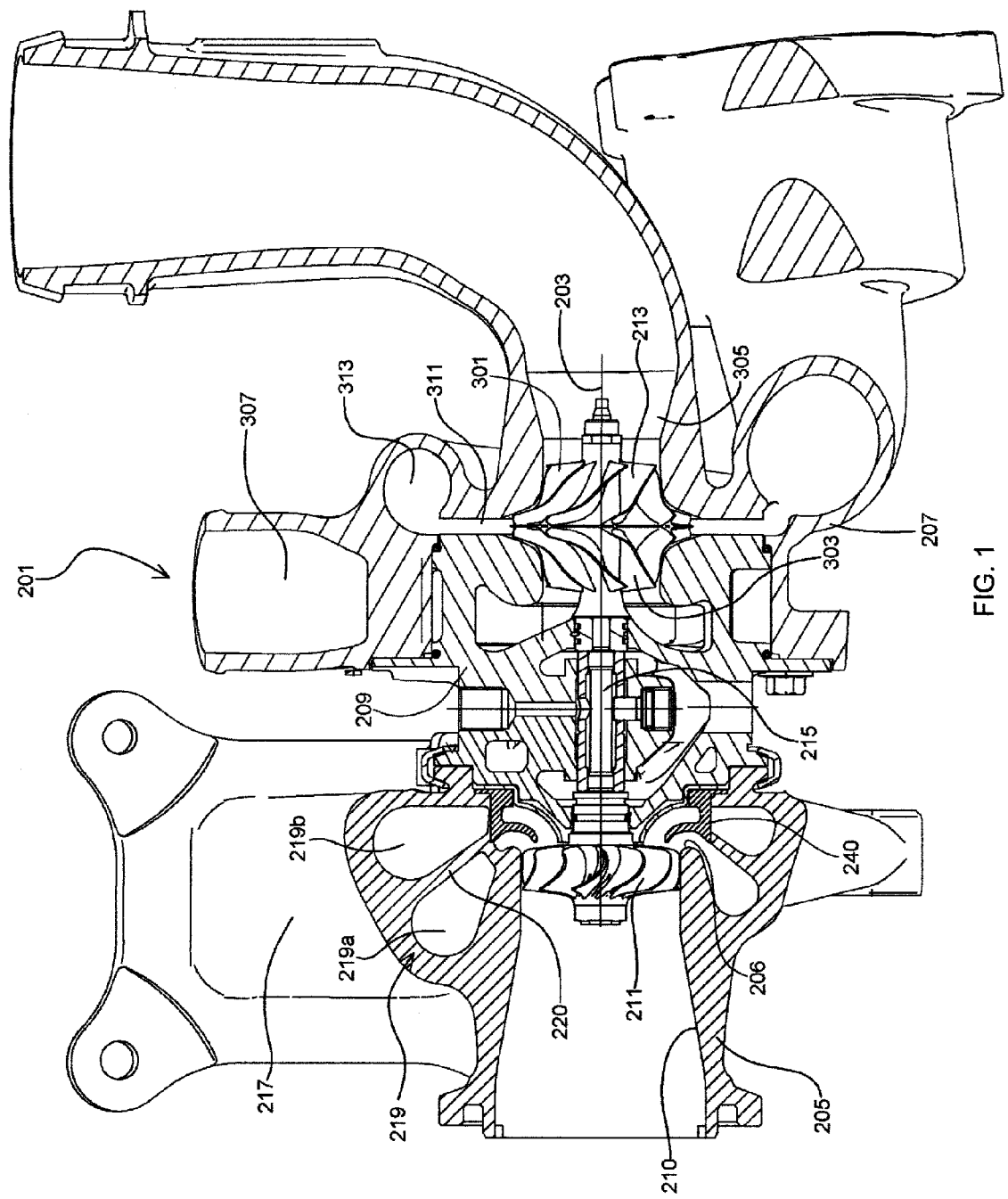
FIG. 1 is an axial cross-sectional view of a turbocharger in accordance with one embodiment of the invention.

FIG. 1 illustrates a turbocharger 201 in accordance with one embodiment of the invention. The turbocharger 201 is similar in many respects to that described in U.S. Pat. No. 8,353,161, U.S. patent application Ser. Nos. 12/799,182, 12/799,195, and 12/799,196, all of which are incorporated herein by reference. With reference to FIG. 1, in one embodiment of the invention the turbocharger 201 includes a turbocharger housing and a rotor configured to rotate within the turbocharger housing along an axis 203 of rotor rotation on a set of bearings. The turbocharger housing includes a turbine housing 205, a compressor housing 207, and a bearing housing 209 (i.e., a center housing that contains radial and thrust bearings) that connects the turbine housing to the compressor housing. The rotor includes an axial turbine wheel 211 located substantially within the turbine housing, a radial compressor wheel 213 located substantially within the compressor housing, and a shaft 215 extending along the axis of rotor rotation, through the bearing housing, to connect the turbine wheel to the compressor wheel and provide for the turbine wheel to drive the compressor wheel in rotation around the rotation axis 203.

The turbine housing 205 and turbine wheel 211 form a turbine, or turbine assembly, configured to receive high-pressure and high-temperature exhaust gas from an exhaust manifold of an engine. The turbine wheel (and thus the rotor) is driven in rotation around the axis of rotor rotation 203 by the high-pressure and high-temperature exhaust gas acting on a plurality of blades 231 of the turbine wheel. The exhaust gas is expanded to a lower total pressure while passing through the blades, and is subsequently axially released via a turbine outlet 210 into an exhaust system (not shown).

The turbine wheel 211 is an axial-flow turbine wheel, meaning that exhaust gas enters the wheel in a substantially axial direction (although the flow has a substantial circumferential or swirl component of direction), as distinguished from a radial-inflow wheel where the incoming flow is directed substantially radially inwardly to the wheel. An outer diameter of the turbine wheel 211, as defined by radially outer tips of the blades 231, is generally constant from the inlet side to an outlet side of the turbine wheel.

The compressor housing 207 and compressor wheel 213 form a radial compressor. The compressor wheel, being driven in rotation by the exhaust-gas driven turbine wheel 211 via the shaft 215, is configured to compress axially received input air (e.g., ambient air, or already-pressurized air from a previous-stage in a multi-stage compressor) into a pressurized air stream that may be ejected circumferentially and radially from the compressor and sent on to an engine intake.

Figure 2:
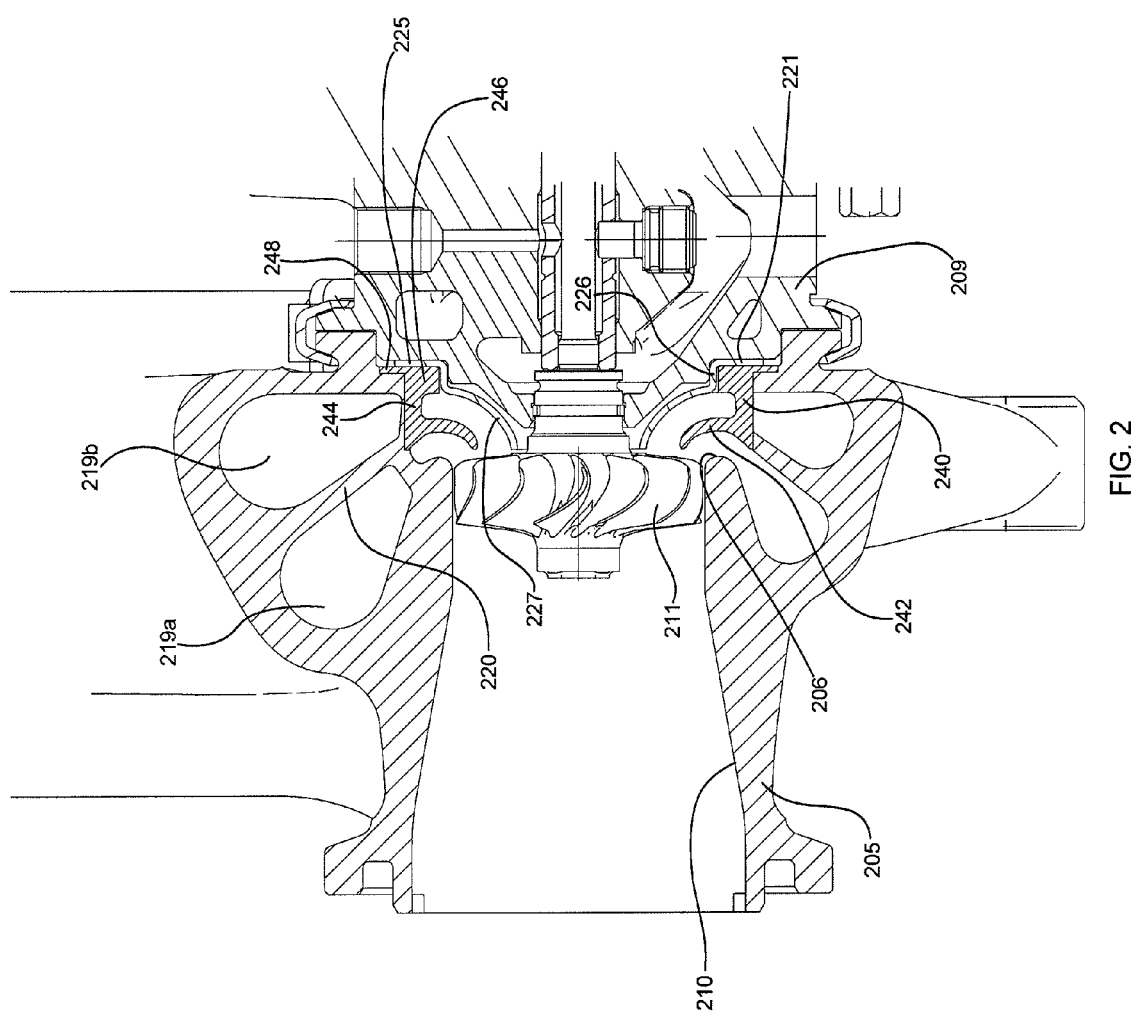
FIG. 2 is an enlarged portion of FIG. 1.

With reference to FIGS. 1 and 2, the turbine housing 205 forms an exhaust gas entrance passageway 217 configured to receive the exhaust gas from the engine in a direction normal to and radially offset from the rotor rotation axis 203. It is advantageous to design a reciprocating engine's exhaust system in such a manner as to take advantage of the pressure pulsation that occurs in the exhaust stream. In particular, it is known to employ what is known as "pulse separation" wherein the cylinders of the engine are divided into a plurality of subgroups, and the pulses from each subgroup of cylinders are isolated from those of the other subgroups by having independent exhaust passages for each subgroup. To take best advantage of pulse separation, it is desired to minimize the communication or cross talk between the separate exhaust passages. Accordingly, in the case of a turbocharged engine, it is advantageous to maintain separate exhaust passages all the way into the turbine of the turbocharger. To this end, the turbine housing 205 of the turbocharger advantageously comprises a meridionally divided turbine housing. Specifically, the exhaust gas entrance passageway 217 defines two separate passages, one passage receiving exhaust gas from one subgroup of engine cylinders and the other passage receiving exhaust gas from the other subgroup of engine cylinders. The turbine housing also defines a generally annular chamber 219 that is divided into two scrolls 219a and 219b that are separate from one another and are respectively fed with exhaust gas via the separate passages of the exhaust gas entrance passageway 217. Various numbers of scrolls can be employed in accordance with the invention, so while two scrolls are illustrated in the drawings, more than two can be employed if desired.

FIGS. 1 and 2 depict one embodiment in accordance with the invention, wherein the generally annular chamber 219 is meridionally divided into two scrolls 219a and 219b each occupying approximately 360 degrees of the circumference of the chamber. The chamber is divided into the separate scrolls by a wall 220 that extends substantially fully about the circumference. Each scroll 219a and 219b has its own separate outlet through which exhaust gas is discharged from the scroll into the inlet of the turbine wheel 211. To this end, the turbine housing assembly includes a dividing member 240, which is illustrated as being a separately formed part from the turbine housing 205, but alternatively can be integral with the turbine housing. The dividing member 240 defines a dividing wall 242 that is a 360-degree circumferentially continuous wall that essentially forms an extension of the scroll dividing wall 220. The dividing wall 242 is supported by a plurality of circumferentially spaced support members 244 that extend generally axially and have first ends joined to the dividing wall 242 and axially opposite second ends joined to a ring-shaped portion 246 of the dividing member 240. Thus, there are openings between the spaced support members 244 for the flow of exhaust gas from the second scroll 219b to pass therethrough. A radially outwardly extending flange 248 is formed on the ring-shaped portion 246 of the dividing member.

The turbine housing assembly further includes a heat shroud 221. The heat shroud 221 has a radial flange portion 225 that is captured or sandwiched between the turbine housing 205 and the center housing 209, adjacent to the flange 248 of the dividing member 240, as shown in FIGS. 1 and 2. A generally tubular, axially extending portion 226 extends from the radial flange portion 225 for a small distance and joins with a tapering portion 227 that extends axially and radially inwardly to form a radially inner boundary of the axial inlet to the turbine wheel 211.

In accordance with the invention, the turbine housing assembly defines a circumferentially and radially extending dividing wall that separates the first scroll from the second scroll, and the first outlet from the first scroll 219a is defined in part by a radially inner portion of the dividing wall, while the second outlet from the second scroll 219b is also defined in part by the radially inner portion of the dividing wall. In the embodiment of FIGS. 1 and 2, this radially inner portion of the dividing wall constitutes the dividing wall 242 of the separate dividing member 240. This radially inner portion is curved so that a radially inner end thereof extends generally in the axial direction. The first outlet from the first scroll 219a is defined between the dividing wall 242 and a tip shroud 206 of the turbine housing, the tip shroud and the hub of the turbine wheel together bounding a flow path for the exhaust gases through the turbine wheel.

Also in accordance with the embodiment of FIGS. 1 and 2, the turbine housing assembly defines a wall spaced radially inwardly of the radially inner portion 242 of the dividing wall, the second outlet for the scroll 219b being defined between said wall and the radially inner portion of the dividing wall. In this embodiment, this wall constitutes the tapering portion 227 of the heat shroud 221. This wall or tapering portion 227 is also curved so that a radially inner end thereof extends generally in the axial direction. The radially inner end of the tapering portion 227 is at a radial location corresponding to a radially inner end of a leading edge of the blades 231. The heat shroud 221 and the dividing member 240 thus direct each of the exhaust gas streams from the two scrolls 219a and 219b into the turbine wheel 211 in a substantially axial direction (i.e., with little or no radial component of velocity at the leading edges of the blades 231). The first outlet is generally radially outward of the second outlet such that the exhaust gas from the first scroll 219a is fed to a radially outer portion of the inlet side of the turbine wheel 211 and the exhaust gas from the second scroll 219b is fed to a radially inner portion of the inlet side of the turbine wheel.

The turbine of this embodiment is of a vaneless or statorless design, also referred to herein as a "nozzleless" turbine. As compared to a design with vanes or nozzles, such a design advantageously is cost efficient, reliable (in that it eliminates parts from an environment in which they are likely to erode), avoids friction pressure losses, and avoids establishing a critical throat area that could choke the flow in some operating conditions. The absence of vanes or nozzles at the inlet means that the flow entering the wheel 211 has a substantial circumferential or swirl component of velocity.

Figure 3:
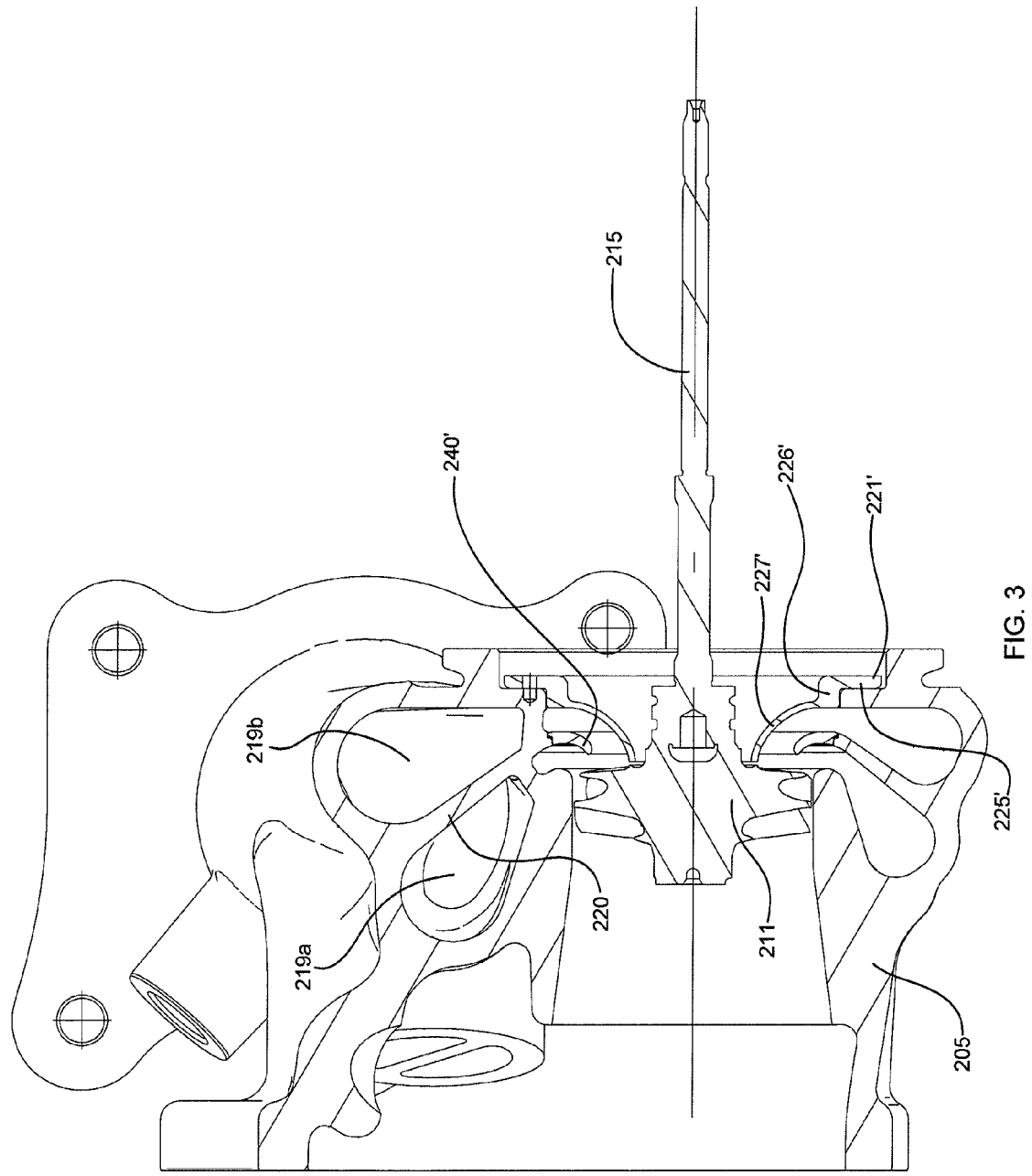
FIG. 3 is a sectioned view of a turbine portion of a turbocharger in accordance with another embodiment of the invention.
Figure 4:
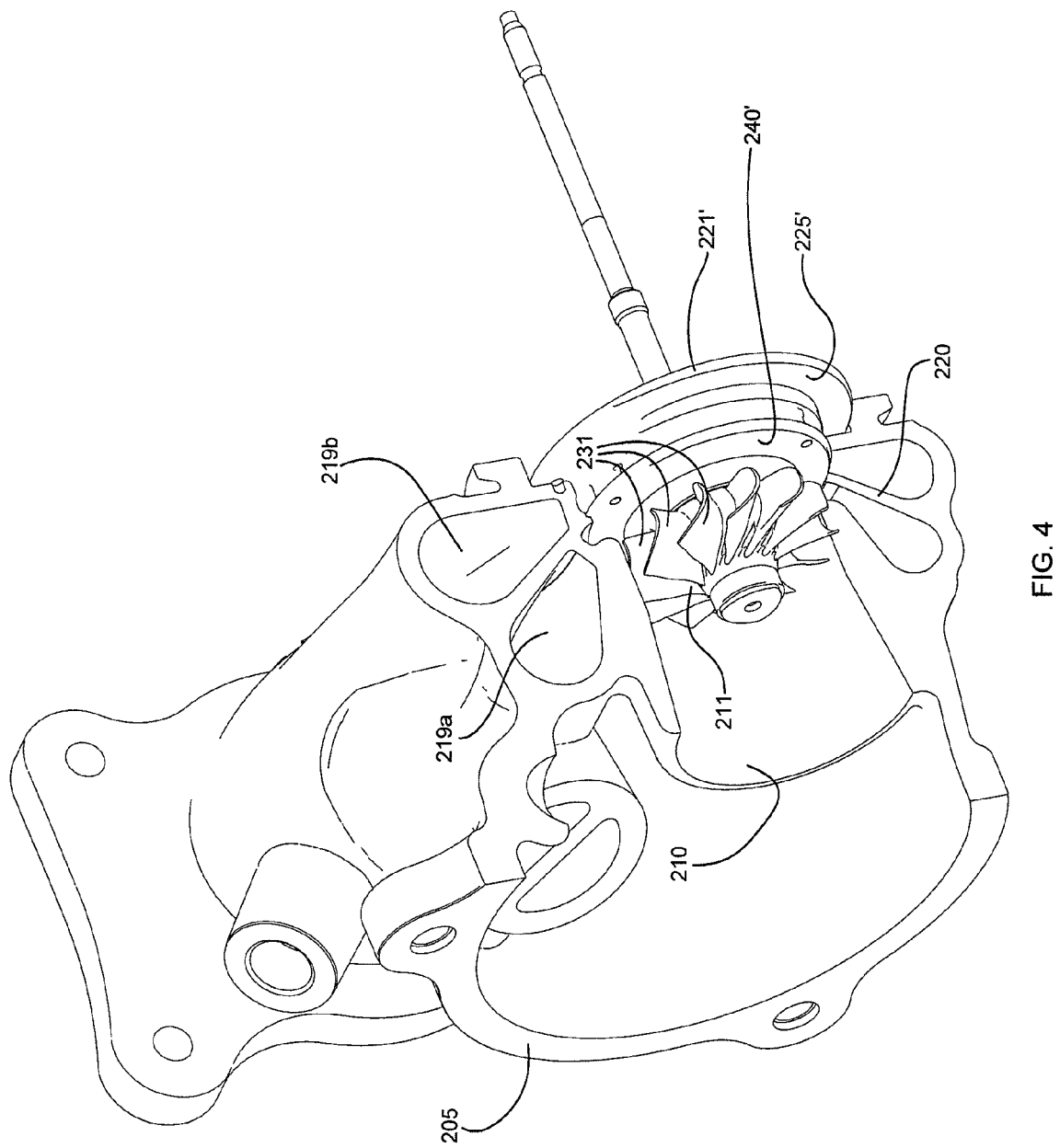
FIG. 4 is a sectioned isometric view of the turbine of FIG. 3.
Figure 6:
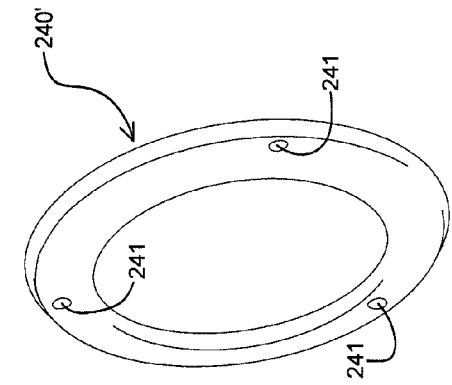
FIG. 6 is an isometric view of a meridional heat shroud of the turbine of FIG. 3.
Figure 7:
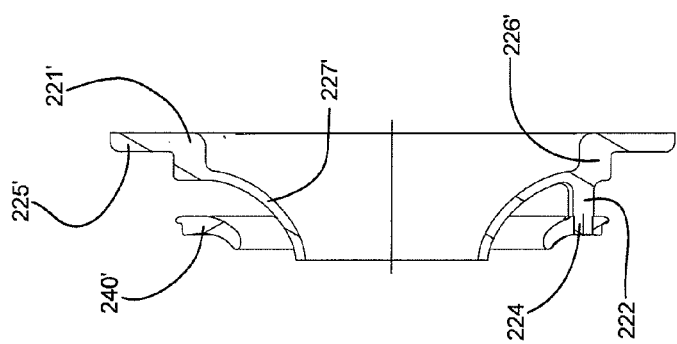
FIG. 7 is a cross-sectional view of the heat shroud assembled with the meridional heat shroud.
Figure 5:
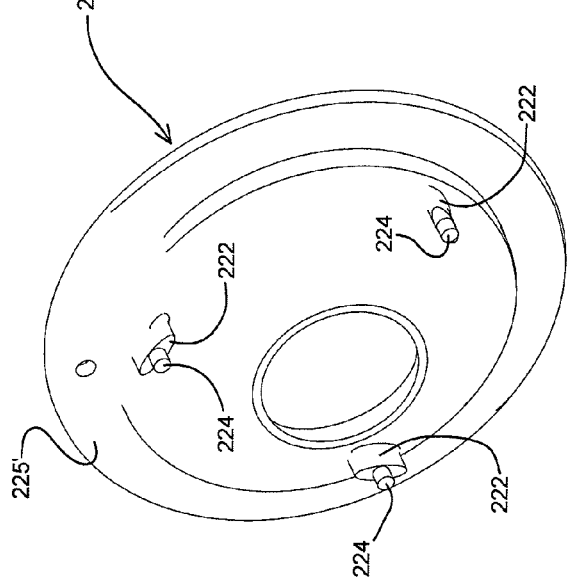
FIG. 5 is an isometric view of a heat shroud of the turbine of FIG. 3.

With reference to FIGS. 2-4, each of the scrolls 219a and 219b comprises an inwardly spiraling passageway characterized by a convergent cross-section that spirals inward and converges to accelerate the exhaust gas, and to achieve supersonic speeds for at least some operating conditions of the engine (and thus of the turbocharger) as the exhaust gas is turned axially downstream and impinges on the axially upstream end of the blades 231. The potentially supersonic flows of the accelerated exhaust gas streams in the inner radius of the scrolls 219a and 219b thus are directed into the turbine wheel 211 in a substantially axial direction.

With reference to FIG. 1, the compressor housing 207 and compressor wheel 213 form a dual, parallel, radial compressor. More particularly, the compressor wheel has two back-to-back oriented sets of impeller blades. A first set of impeller blades 301 are oriented in a conventional configuration with an inlet facing axially outward (away from the turbine) to receive air from that direction. A second set of impeller blades 303 are oriented in a reverse configuration with an inlet facing axially inward (toward the turbine) to receive air brought in tangentially and turned to travel axially into the second set of impeller blades. The first and second set of impeller blades can be manufactured in the form of a single, integral wheel, e.g., as illustrated, or may comprise an assembly of a plurality of parts.

The compressor housing 207 is configured to direct inlet air to each set of compressor blades in parallel, and to direct the passage of pressurized gas from each compressor. In this embodiment, the compressor housing comprises two separate axially positioned air inlets; namely, a first air inlet passage 305 that is positioned adjacent an end of the compressor housing to pass inlet air in an axial direction to the first compressor blades 301, and a second air inlet passage 307 that is separate from the first air inlet passage 305. Pressurized air that is provided by the compressor wheel 213 is directed radially from each set of impeller blades 301 and 303 through a single diffuser 311 to a compressor scroll 313.

This dual-path, parallel, radial compressor configuration can operate at higher speeds than a comparable single-path radial compressor and might produce substantially no axial loading in steady state operation. The higher operating speeds will typically better match the operational speeds of the axial turbine.

A second embodiment of the invention is illustrated in FIGS. 3 through 7. This second embodiment is generally similar to the first embodiment described above, so the following description will focus primarily on the differences, which relate to the structures for defining the first and second outlets from the scrolls 219a and 219b into the turbine wheel. Specifically, the radially inner portion of the dividing wall in the second embodiment is formed by a dividing member 240' that is configured as a ring-shaped part, generally corresponding to the dividing wall 242 of the dividing member 240 in the first embodiment. However, the dividing member 240' does not include support members and a further ring-shaped portion for supporting the dividing member 240'. Instead, the support members and ring-shaped portion are provided by a heat shroud 221'.

The heat shroud 221' is generally similar to the heat shroud 221 of the first embodiment, and in that regard it includes a radial flange portion 225', a short generally tubular portion 226', and a tapering portion 227' that all generally correspond to the flange portion 225, tubular portion 226, and tapering portion 227 of the first embodiment. The chief difference relative to the first embodiment is the provision of a plurality of circumferentially spaced support members 222 on the heat shroud 221'. The support members 222 extend generally axially and have shapes that are at least somewhat streamlined with respect to the swirling direction of exhaust gas passing through the openings or spaces between adjacent ones of the support members 222. At the distal or free end of each of the support members 222 is a pin or dowel portion 224.

The dividing member 240' includes a plurality of circumferentially spaced apertures 241 for receiving the dowel portions 224 of the heat shroud 221'. The apertures 241 are smaller than the support members 222, and hence the dividing member 240' abuts the ends of the support members is prevented by the support members from moving axially closer to the tubular portion 226' of the heat shroud. With reference to FIG. 3, the dividing member 240' is prevented from moving axially away from the heat shroud, and is radially centered, by abutting a stepped portion of the turbine housing, which is complementarily shaped to a stepped portion of the dividing member. So located, the dividing member 240' effectively forms an extension of the scroll dividing wall 220.

The first outlet from the first scroll 219a thus is formed between the dividing member 240' and the turbine tip shroud, and the second outlet from the second scroll 219b is formed between the dividing member 240' and the tapering portion 227' of the heat shroud 221'.

The configurations of the embodiments described herein are significant for a number of reasons. As noted, the meridional division of the turbine housing, which division extends all the way to the inlet to the turbine wheel 211, preserves as long as reasonably possible the separation or isolation of the pulses in the exhaust stream from one subgroup of engine cylinders from the pulses in the exhaust stream from the other subgroup of cylinders. This pulse division can improve the overall efficiency of the internal combustion engine because of improved valve charge exchange and decreased requirement for boost pressure.

Additionally the configurations of the described embodiments are particularly effective for overcoming the efficiency limitations that limit the effectiveness of turbochargers on small gasoline powered engines, where the practical limitations of conventional axial turbines render them relatively ineffective for practical and efficient use.

The described embodiments provide an effective turbine with large blades that can be efficiently manufactured, even in small sizes. The comparatively large size and small number of axial turbine blades are well suited to casting in small sizes when smaller blades might be too small for conventional casting techniques. The large blades do not require manufacturing tolerances that may be limiting when applied to a very small turbine.

Singularly, the use of either a no-axial-load turbine or a no-axial load compressor is less efficient than their conventional axially loaded counterpart. Moreover, turbines and compressors are typically configured to have partially offsetting axial loads. Although these loads are far from perfectly matched, they do provide at least some relief from axial loads. If only one component (i.e., either the turbine or the compressor) creates no axial load, the remaining load from the other component is not partially offset, and even greater axial loads occur, requiring an even larger thrust bearing.

In the described embodiments, a no-axial-load compressor is combined with a no-axial-load turbine, allowing for the use of much more efficient thrust bearings. It is believed that in some embodiments the thrust load requirements may be as small as only 20% of the conventional counterparts. Bearings configured to carry such small loads can be adapted to be substantially more energy efficient. As a result, despite the potentially lower efficiencies of some of the system components, the overall system efficiency of the turbocharger may be significantly higher than in a conventional counterpart.

While many conventional turbochargers are designed to produce no downstream swirl, some embodiments of the present invention may be configured with blades that produce either negative or even positive swirl. In designing a turbine under the present invention, the production of downstream swirl might be considered of less interest than the efficient extraction of energy while producing little or no axial loading.

Many modifications and other embodiments of the inventions set forth herein will come to mind to one skilled in the art to which these inventions pertain having the benefit of the teachings presented in the foregoing descriptions and the associated drawings. For example, while the embodiments described above employ a pair of members formed separately from the turbine housing for defining the flow paths from the two scrolls into the axial turbine wheel, alternatively a single member formed separately from the turbine housing can be used (e.g., heat shroud 221 and dividing member 240 can together be one integral piece; likewise, the heat shroud 221' and dividing member 240' can together be one integral piece). As a further alternative, the members defining the outlets from the two scrolls into the axial turbine wheel can be integrally formed as part of the turbine housing. As a still further alternative, the division of the two separate exhaust gas streams by the dividing wall 220 can be terminated at a location having a radius slightly larger than the maximum tip radius of the turbine wheel, and the separate dividing member can be omitted. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An axial turbine for an exhaust-gas-driven turbocharger, the turbine having no inlet stator, and comprising:
an axial turbine wheel comprising a hub and a plurality of blades extending radially outward from the hub; and
a turbine housing assembly in which the turbine wheel is mounted, the turbine housing assembly comprising a turbine housing that defines a meridionally divided scroll extending circumferentially and surrounding the turbine wheel, the meridionally divided scroll defining a first scroll extending fully about the turbine wheel and a separate second scroll extending fully about the turbine wheel, the turbine housing assembly further comprising a separately formed heat shroud;
the turbine housing assembly defining a separate inlet for each of the first and second scrolls through which separate exhaust gas streams are received;
the turbine housing assembly defining separate first and second outlets for each of the first and second scrolls, respectively, through which the respective exhaust gas streams are fed into an inlet side of the turbine wheel, wherein the turbine housing assembly defines a circumferentially and radially extending dividing wall that separates the first scroll from the second scroll, the heat shroud being spaced radially inwardly of a radially inner portion of the dividing wall, wherein the first outlet is bounded between the radially inner portion of the dividing wall and a tip shroud of the turbine housing assembly, the tip shroud and the hub of the turbine wheel together bounding a flow path for the exhaust gases through the turbine wheel, the second outlet being bounded between the radially inner portion of the dividing wall and the heat shroud, wherein the radially inner portion of the dividing wall is curved so that a radially inner end thereof extends in the axial direction, wherein the heat shroud is curved similar to the radially inner portion of the dividing wall such that a radially inner end of the heat shroud extends in the axial direction, and wherein the radially inner end of the heat shroud is at a radial location corresponding to a radially inner end of a leading edge of the blades.

2. The axial turbine of claim 1, wherein the first and second outlets are configured so that the respective exhaust gas streams are fed in an axial direction into the turbine wheel, and so that the first outlet is radially outward of the second outlet such that the exhaust gas from the first outlet is fed to a radially outer portion of the inlet side of the turbine wheel and the exhaust gas from the second outlet is fed to a radially inner portion of the inlet side of the turbine wheel.

3. The axial turbine of claim 1, wherein the heat shroud is a formed sheet metal part.

4. The axial turbine of claim 1, wherein the radially inner portion of the dividing wall is part of a dividing member that is a separately formed part from the turbine housing.

5. The axial turbine of claim 4, wherein the heat shroud defines a plurality of circumferentially spaced support members that extend axially and engage the dividing member to position the dividing member axially with respect to the heat shroud.

6. A turbocharger, comprising:

an axial turbine, the axial turbine having no inlet stator, and comprising:

an axial turbine wheel comprising a hub and a plurality of blades extending radially outward from the hub; and a turbine housing assembly in which the turbine wheel is mounted, the turbine housing assembly comprising a turbine housing that defines a meridionally divided scroll extending circumferentially and surrounding the turbine wheel, the meridionally divided scroll defining a first scroll extending fully about the turbine wheel and a separate second scroll extending fully about the turbine wheel, the turbine housing assembly further comprising a separately formed heat shroud;

the turbine housing assembly defining a separate inlet for each of the first and second scrolls through which separate exhaust gas streams are received;

the turbine housing assembly defining separate first and second outlets for each of the first and second scrolls, respectively, through which the respective exhaust gas streams are fed into an inlet side of the turbine wheel, wherein the turbine housing assembly defines a circumferentially and radially extending dividing wall that separates the first scroll from the second scroll, the heat shroud being spaced radially inwardly of a radially inner portion of the dividing wall, wherein the first outlet is bounded between the radially inner portion of the dividing wall and a tip shroud of the turbine housing assembly, the tip shroud and the hub of the turbine wheel together bounding a flow path for the exhaust gases through the turbine wheel, the second outlet being bounded between the radially inner portion of the dividing wall and the heat shroud, wherein the radially inner portion of the dividing wall is curved so that a radially inner end thereof extends in the axial direction, wherein the heat shroud is curved similar to the radially inner portion of the dividing wall such that a radially inner end of the heat shroud extends in the axial direction, and wherein the radially inner end of the heat shroud is at a radial location corresponding to a radially inner end of a leading edge of the blades;

a compressor comprising a compressor wheel mounted in a compressor housing, the compressor housing defining a compressor discharge scroll receiving pressurized air from the compressor wheel;

a shaft having one end affixed to the compressor wheel and an opposite end affixed to the turbine wheel; and a center housing assembly connected between the turbine housing assembly and the compressor housing, the center housing assembly containing bearings for the shaft.

7. The turbocharger of claim 6, wherein the first and second outlets are configured so that the respective exhaust gas streams are fed in an axial direction into the turbine wheel, and so that the first outlet is radially outward of the second outlet such that the exhaust gas from the first outlet is fed to a radially outer portion of the inlet side of the turbine wheel and the exhaust gas from the second outlet is fed to a radially inner portion of the inlet side of the turbine wheel.

8. The turbocharger of claim 6, wherein the heat shroud is a formed sheet metal part.

* * * * *